United States Patent [19]

Clemens

[11] 4,213,148
[45] Jul. 15, 1980

[54] RECORDING/PLAYBACK APPARATUS USING A SINGLE PILOT TONE FOR ACTIVE TRACKING AND CONTROL OF A VIDEO DISC PICKUP DEVICE

[75] Inventor: Jon K. Clemens, Skillman, N.J.

[73] Assignee: RCA Corporation, New York, N.Y.

[21] Appl. No.: 938,963

[22] Filed: Sep. 1, 1978

[51] Int. Cl.² .......................... H04N 5/76; G11B 3/38
[52] U.S. Cl. .......................... 358/128.6; 179/100.4 D; 360/77
[58] Field of Search ..................... 358/128; 360/10, 11, 360/18, 19, 77, 78; 179/100.3 V, 100.3 D, 100.4 D

[56] References Cited

U.S. PATENT DOCUMENTS

| 3,963,860 | 6/1976 | Burrus ................................ 358/128 |
| 4,018,984 | 4/1977 | Keizer ................................. 358/128 |
| 4,018,987 | 4/1977 | Keizer ................................. 358/128 |
| 4,022,968 | 5/1977 | Keizer ................................. 358/128 |
| 4,067,044 | 1/1978 | Maeda et al. ........................ 358/128 |

Primary Examiner—Bernard Konick
Assistant Examiner—Donald McElheny, Jr.
Attorney, Agent, or Firm—Eugene M. Whitacre; Joseph S. Tripoli

[57] ABSTRACT

In a video disc playback apparatus, an active tracking control system is provided using a single pilot signal. The pilot signal is recorded on an information track of a video disc record such that each convolution of the track contains a non-integral number of cycles of the pilot signal. The phase of the pilot signal in a given convolution bears a known relationship to the phase of the pilot signals in the convolutions preceding and succeeding the given convolution. The given convolution includes information representing a reference phase signal. The phase of the recovered reference signal is compared to the phase of the recovered pilot signal which may include phase information from adjacent convolutions to provide an error signal. Pickup positioning apparatus is made responsive to the error signal for maintaining the pickup on the desired path along the information track.

20 Claims, 18 Drawing Figures

RECORDING/PLAYBACK APPARATUS USING A SINGLE PILOT TONE FOR ACTIVE TRACKING AND CONTROL OF A VIDEO DISC PICKUP DEVICE

The present invention relates generally to video disc recording and playback techniques and more particularly to active tracking and control for maintaining a pickup device in a desired position relative to an information track recorded on a video disc record.

In U.S. Pat. No. 3,842,194 issued on Oct. 15, 1974 to Jon K. Clemens, video disc playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable. The capacitance variations are sensed to recover the recorded information.

In the video disc system of the Clemens type, the spiral groove which contains the recorded information track provides passive guidance for a pickup device in following the information track. That is, a signal pickup stylus is guided by the spiral groove on the surface of the video disc record. However, there are instances where it may be desirable to include active tracking and control of the stylus position relative to the information track as opposed to merely the passive control provided by the spiral groove.

In certain other forms of video disc systems an information track is recorded on the surface of a flat disc. Typically, the information track is formed in the shape of a spiral proceeding from the outer radius of the disc to an inner radius of the disc. In such grooveless disc systems, it is typical to provide some mechanism for maintaining the pickup stylus, or other pickup device, along the path of the information track. In one such system a first pilot tone is recorded along one side of the first convolution of an information track. When the first pilot signal has been recorded on one side of the first convolution, a switching mechanism is actuated in order to record a second pilot signal on the other side of the first convolution. This is necessarily on the first side of the second convolution. The two pilot signals are typically recorded at different frequencies. The pilot signal recording proceeds by switching back and forth between the two pilot signals for successively recorded convolutions of the information track. The end result is a grooveless video disc having a spiral information track with a pilot signal of one frequency on one side of every other convolution and a pilot signal at another frequency on the other side of the given convolution. The other convolutions are reversed. Upon playback each of the pilot signals are detected and provided to a comparator which detects the presence and strength of each of the two pilot signals in order to provide a control signal to the pickup mechanism. In this way, the position of the pickup stylus or device may be maintained along the center of the spiral information track.

One of the problems with the two-pilot signal tracking and control system is that the mechanism for recording both the information track and the pilot signals is rather complex. Special techniques, such as may be found in optical recording, are required in order to record the information track and pilot tones on a grooveless disc. In addition, the playback apparatus in such a system must also provide switching mechanisms for switching back and forth between the two pilot tone frequencies for each convolution of the spiral information track. Another problem associated with the two pilot tone tracking system is the fact that the pilot signals are recorded between successive convolutions of the information track which results in the utilization of surface area where the pilot signals are recorded which could be otherwise used for the recording of information signals.

The present invention describes a system for active tracking of an information track through the utilization of a single pilot signal which is recorded along with the information signals directly in the spiral information track. Therefore, only one track is recorded which allows simpler recording methods, such as the electromechanical cutting of geometric variations in the information track, to be used. In addition, since only a single pilot signal is utilized, no switching is required either in recording or in playback.

In accordance with the present invention, a tracking control apparatus is described in the context of a video disc playback system. The video disc record has an information track comprising a plurality of convolutions, each convolution containing recorded representations of signal information including regularly recurring timing signals and a pilot signal. The pilot signal is recorded such that each convolution of the information track contains a non-integral number of cycles of the pilot signal. The phase of the pilot signal in a given convolution has a known relationship with respect to the phase of the pilot signal in an immediately-preceding convolution as well as a known phase relationship to the pilot signal in the convolution immediately succeeding the given convolution. The playback apparatus includes a signal pickup means for sensing the recorded representations along the information track as the disc is rotated. In the tracking control apparatus a means is provided which is responsive to the signals provided by the signal pickup means for generating a first signal representing the sensed phase content of the pilot signal recovered from the given convolution and from the preceding and succeeding convolutions. A means is then provided which is responsive to the signals sensed by the signal pickup means for generating a phase reference signal. A means compares the phase of the first signal and the phase of the reference signal for providing an error signal. Another means, responsive to the error signal, is provided for positioning the signal pickup means in a desired location along the information track.

IN THE DRAWING

Figure 4:
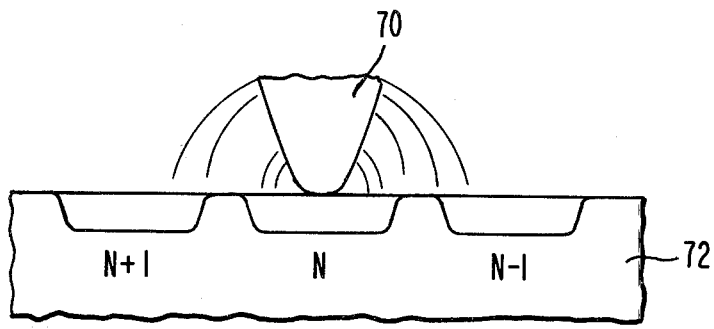
FIG. 4 is a diagram illustrating the manner in which a pickup stylus responds to the tracking pilot signal from each of three successive convolutions in an information track on a video disc record.
Figure 6:
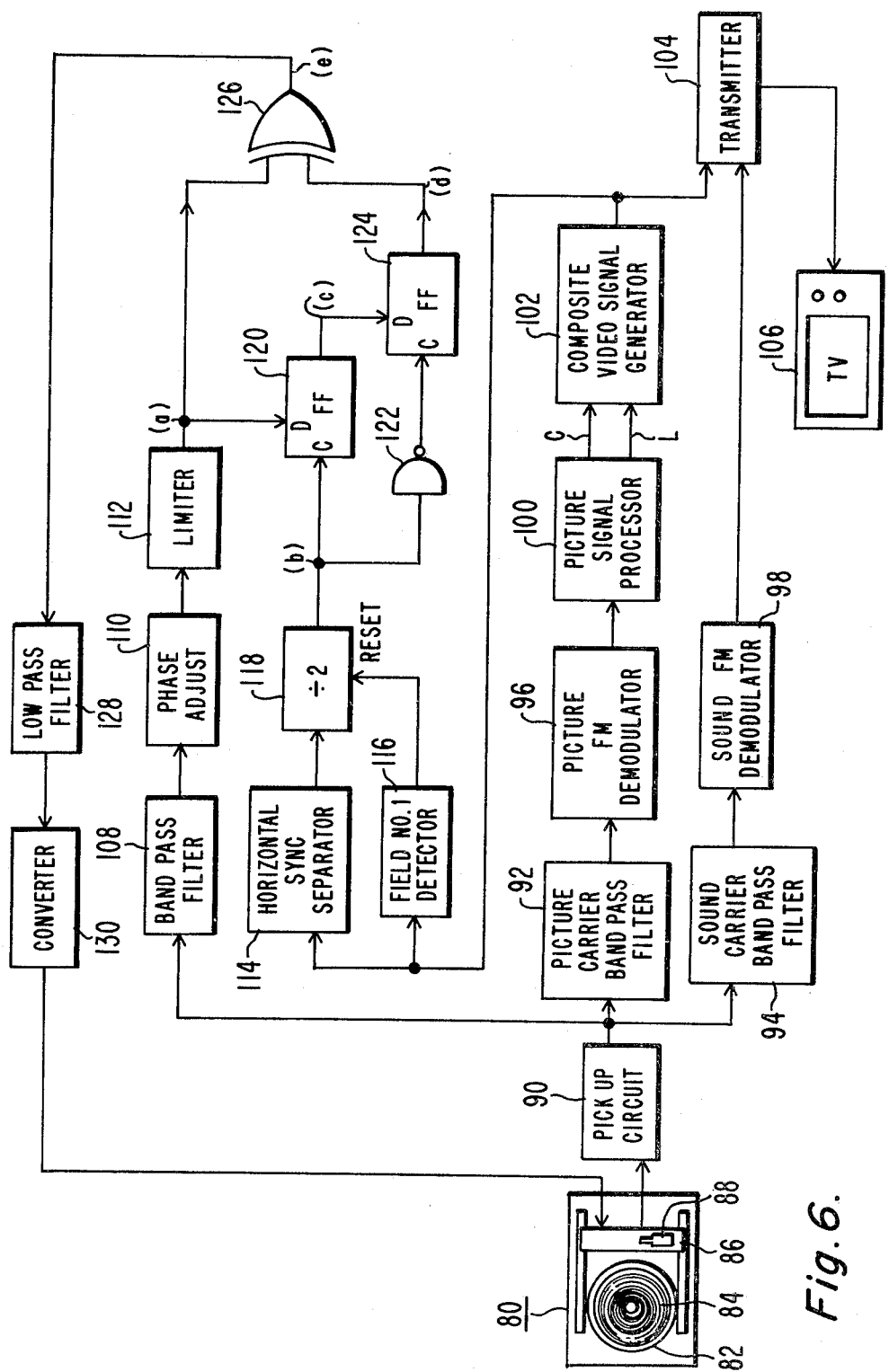
Figure 8:
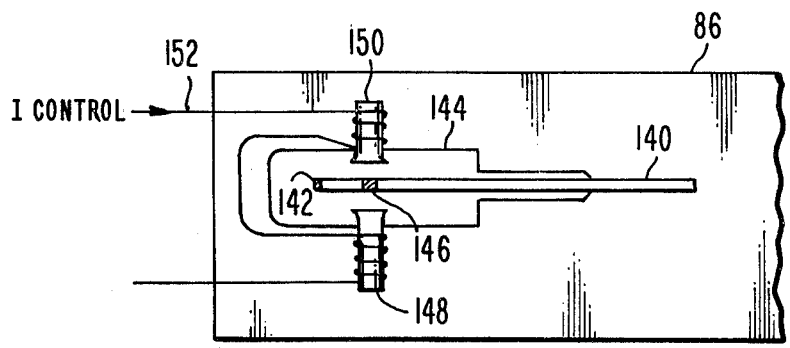
Figure 9:
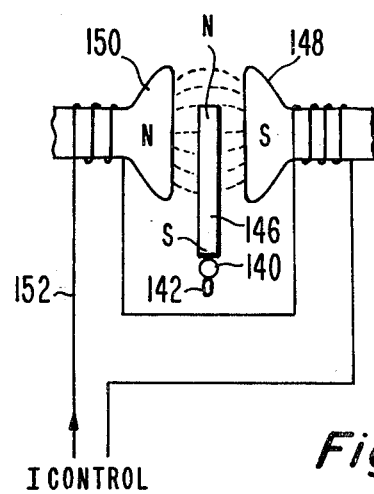

FIGS. 5(a) through 5(e) are vector diagrams useful in explaining the concepts illustrated in FIG. 4;

FIG. 6 is a block diagram representation of a video disc playback system including signal tracking circuitry in accordance with the principles of the present invention;

FIGS. 7(a) through 7(e) are waveforms useful in the explanation of the operation of the tracking circuitry shown in FIG. 6;

FIG. 8 is a representation of a mechanism useful for positioning a playback stylus in response to tracking signals generated in accordance with the principles of the present invention; and FIG. 9 is a further illustration of the magnetic circuit shown in FIG. 8.

Figure 1:
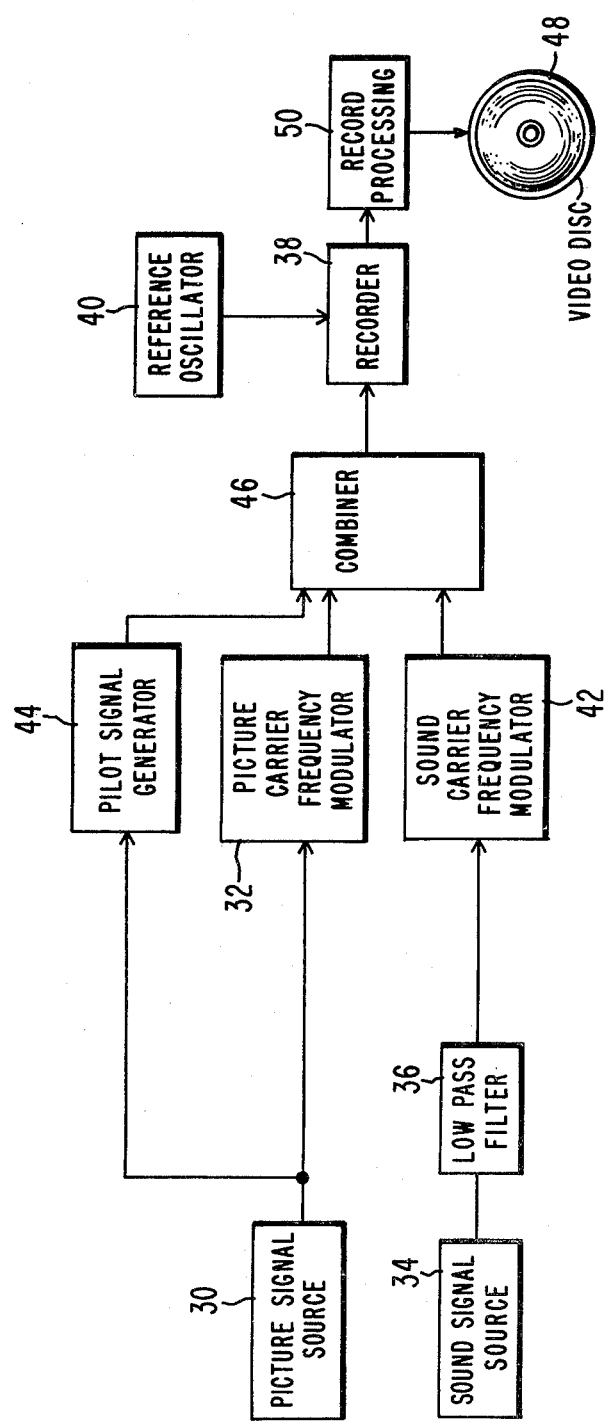
FIG. 1 is a block diagram illustrating a means for recording a pilot signal on a video disc master in accordance with the principles of the present invention.

In the recording system of FIG. 1 a picture signal source 30 supplies a video signal, inclusive of luminance information and chrominance information, representative of a succession of scannings of colored images to be recorded, as well as synchronizing information, to a picture carrier frequency modulator 32. The video signal is illustratively in a buried color subcarrier format as described in U.S. Pat. No. 3,872,498 issued on Mar. 18, 1975 to D. H. Pritchard.

The picture carrier frequency modulator 32 develops at its output terminal a frequency modulated picture carrier signal, the instantaneous frequency of which is varied over a predetermined high frequency deviation range (e.g., 4.3 MHz to 6.3 MHz) in accordance with the amplitude of the video signal supplied from the source 30.

The recording system of FIG. 1 further includes a sound signal source 34 which supplies an audio signal, representative of a desired sound accompaniment for the colored images being recorded, to a low pass filter 36 having a cut-off frequency of approximately 20 KHz. Sound carrier frequency modulator 42 is responsive to the signals provided by low pass filter 36 to develop at the modulator output terminal a modulated sound carrier signal, the instantaneous frequency of which is varied over a predetermined low frequency deviation range (e.g., 716 KHz±55 KHz) in accordance with the amplitude of the signals provided via low pass filter 36.

A pilot signal generator 44 is also illustrated in the recording system of FIG. 1. The pilot signal generator 44 is responsive to signal components provided by the picture signal source 30 to provide a pilot signal which is at a frequency substantially lower than the frequency of the signals provided by the picture carrier frequency modulator 32 and also lower in frequency as compared to the signals provided by sound carrier frequency modulator 42. Thus, the wavelength of the signals provided by the pilot signal generator 44 is much greater than the wavelength of the signals provided by the picture modulator 32 and the sound modulator 42. Details of the pilot signal generator will be described in greater detail in connection with the description of FIG. 2.

A combiner 46 is utilized to additively combine the signals provided at the respective output terminals of the picture carrier modulator 32, the sound carrier modulator 42 and the pilot signal generator 44 to provide a composite recording signal to a recorder 38.

Recorder 38 includes a turntable for rotatably supporting a disc master on which signals are recorded along a spiral track. The disc master may be a smooth or grooveless form of master or the master may have a precut spiral groove to receive the signal information track. The recorder 38 further includes a drive system for rotating the turntable at a speed which is correlated with the picture signal synchronizing components so that the synchronizing components are radially aligned on the disc master. The synchronizing components are typically timing signals indicating the occurrences of frames, fields and horizontal lines. As a result of rotating the turntable at the correlated speed an integral number of synchronizing components occur per turntable revolution, or, per convolution of the information track. The correlation between the turntable speed and picture signal synchronizing components is diagrammatically represented by the connection between the recorder 38 and a reference oscillator 40.

The reference oscillator 40, operating at the NTSC color subcarrier frequency (i.e., 3.58 MHz), is employed in the television signal generating system to provide the synchronizing components of the picture signal.

Recorder 38 is used to generate a disc master which is utilized for the production of video disc copies 48 in the manner described in the aforementioned Clemens patent. The block 50 in FIG. 1 is used to represent these production processes.

It should be noted in connection with FIG. 1 that the composite recording signal includes information which is recorded at a relatively long wavelength through the operation of pilot signal generator 44 as well as information founded upon a common time base via picture modulator 32 which is recorded at a relatively short wavelength. As will be described in greater detail herein, the information thus recorded along the common information track at short wavelengths is used during playback as a phase reference for the signals recorded at the relatively long wavelength.

Figure 1A:
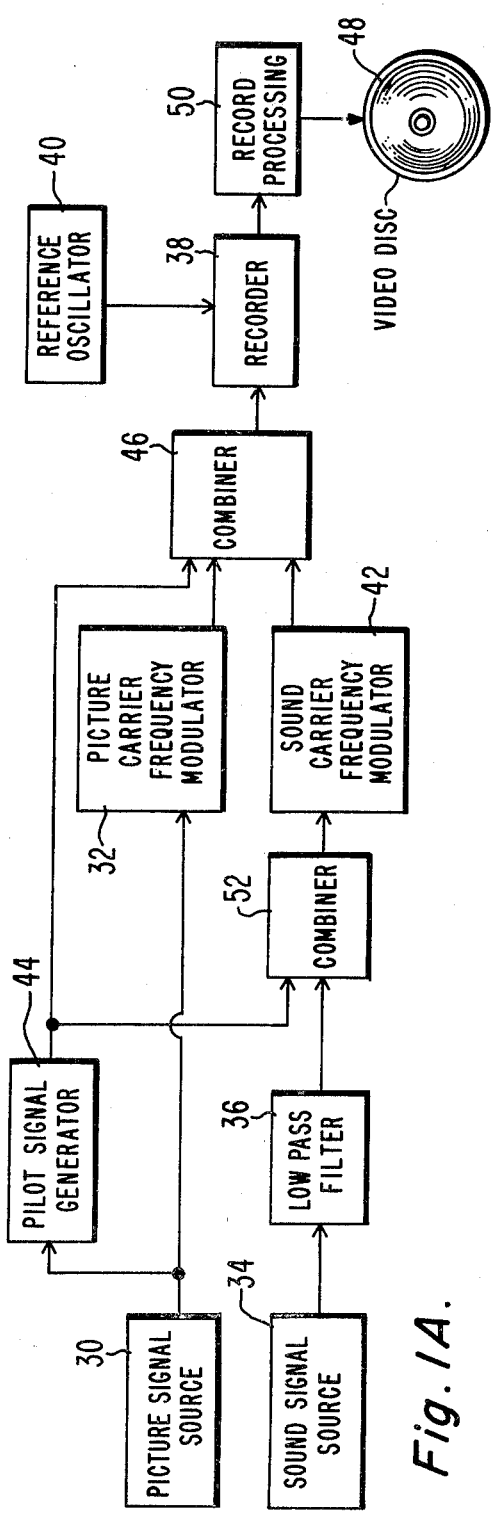
FIG. 1a is a block diagram illustrating an alternative means for recording the pilot signal on a video disc master.

Referring now to FIG. 1a wherein elements which are common to FIG. 1 have the same numerical designations, there is shown a system wherein the phase reference signal, which has a frequency above the audio frequency band (e.g., 20 KHz), is included in the sound channel. In the case of FIG. 1a, the output signals from pilot signal generator 44 are coupled to another combiner 52 which combines these signals with the signals from low pass filter 36. FIG. 1a is shown to illustrate the fact that the phase reference signal may be recorded in the sound channel. Again, the point to be noted is that the phase reference signal and the pilot signal are both recorded along the same information track, but the phase reference signal is modulated onto a carrier having relatively short wavelength.

Figure 2:
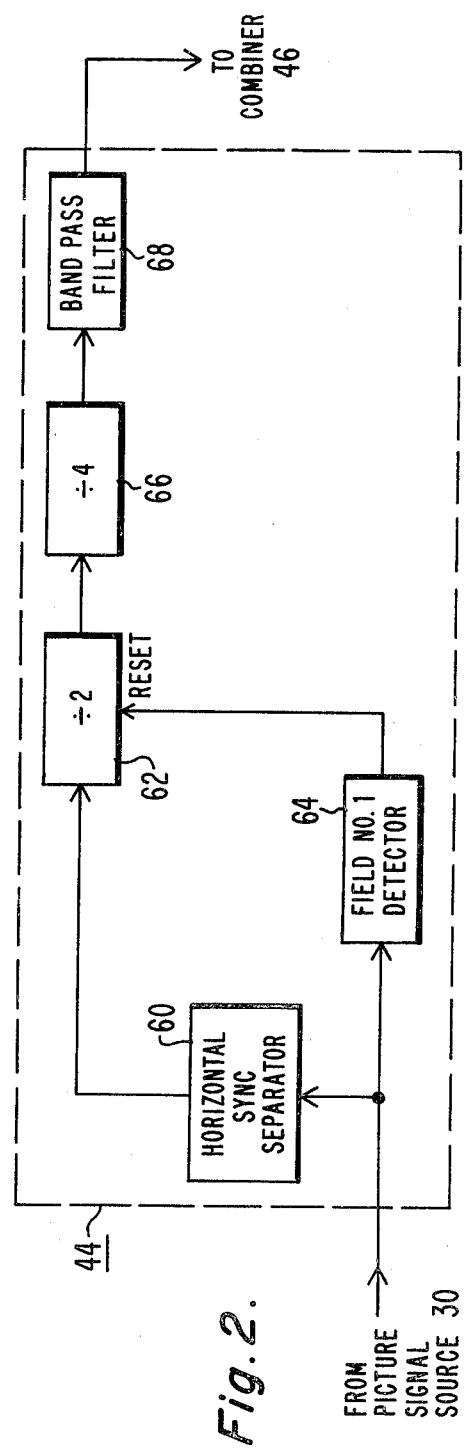
FIG. 2 is a block diagram illustrating one form of pilot signal generator useful in the recording system of FIG. 1.

Before proceeding with the detailed description of FIG. 2, it will be helpful to refer to a specific example of a format for the record and playback system in accordance with the principles of the present invention. In the specific example, two NTSC TV frames are recorded per revolution. Thus, there will be recorded four fields of video information with 1050 horizontal sync pulses per turntable revolution or per convolution of a spiral information track. Thus, the timing signals on the record will be radially aligned. On playback, the disc record is made to rotate at 899.10 rpm.

In accordance with the principles of the present invention it is desired to record the pilot signal such that a non-integral number of cycles of the pilot signal is recorded over each convolution of the spiral track. When this is done it will result in a regular phase progression from one convolution to the next. By selecting the phase progression of the pilot signal such that the phase difference from one convolution to the next is equal in magnitude, then with respect to any given convolution, the phase difference between the given convolution and a preceding convolution will be equal in magnitude to the phase difference between the given convolution and the succeeding convolution, but will be opposite in polarity. For example, if the cycles of the pilot signal are chosen such that there is a 90° phase difference from convolution to convolution, then the phase of the pilot signal in the convolution preceding a given convolution will lead by 90° and the phase of the pilot signal in the convolution succeeding the given convolution will lag the phase of the pilot signal in the given convolution by 90°.

Referring now to FIG. 2, pilot signal generator 44 includes a horizontal sync separator 60 which detects the horizontal sync pulses provided from the picture signal source 30. The horizontal sync pulses from sync separator 60 are provided to a counter 62. Also coupled to the signals from picture signal source 30 is a field No. 1 detector 64. The field No. 1 detector 64 selects one of the four fields recorded in each convolution of the specific example. Detector 64 uses the coincidence of the vertical sync signal, the horizontal sync signal and a specific phase of the color burst phase signal for providing an output signal indicative of the occurrence of the first field. This output signal from detector 64 is used to reset the counter 62 which is a divide-by-two counter. The reset pulse will occur once for every 1050 horizontal sync pulses in the example being described. The function of this reset pulse is merely to start the timing of the pilot signal generator 44 at the same place for every convolution of the spiral information track. If all of the timing signals are correct in the system, the reset pulse is effective only on the first convolution tracked. After the first convolution, the system timing will be correct unless disturbed by an external influence.

The counted down signals provided by counter 62 are then supplied to a second counter 66 which is a divide-by-four counter. The output signals from counter 66 are then provided to a band pass filter 68. The signals at the output terminal of band pass filter 68 are then provided to the combiner 46 as shown in FIG. 1.

In the context of the previously mentioned example wherein two NTSC TV frames are recorded for each revolution of the turntable or convolution of the spiral information track, it will be recalled that 1050 horizontal sync pulses are provided per convolution. The pilot signal generator 44 shown in FIG. 2 forms a pilot signal by dividing the horizontal sync pulse frequency by eight. When this is done the pilot signal will have $131\frac{1}{4}$ cycles for each convolution of the spiral track. In this fashion the pilot signal will progress in phase by 90° for each successive convolution of the information track.

Figure 3:
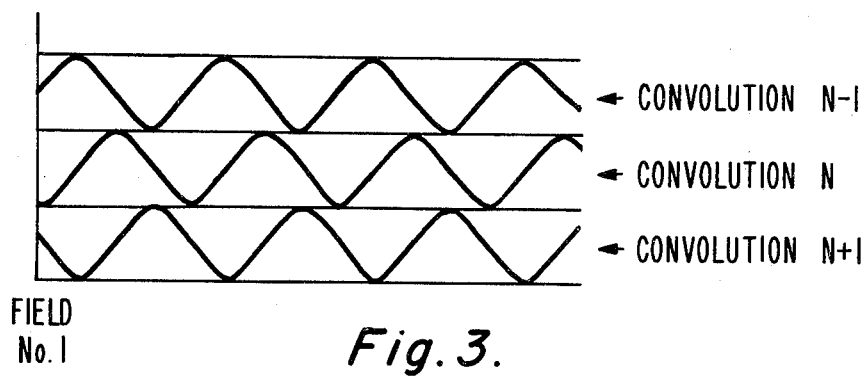
FIG. 3 is a representation of a portion of three adjacent convolutions of an information track of a video disc record illustrating the relationship of the recorded pilot signal therebetween.

FIG. 3 shows the results of recording a pilot tone along a spiral information track wherein the pilot signal advances in phase by 90° for each successive convolution. FIG. 3 shows a segment of three convolutions, each beginning at a spot defined by the field No. 1 detector as previously described in reference to FIG. 2. Looking now at a given convolution labelled N in FIG. 3, it will be seen that the pilot signal in convolution N−1 which precedes convolution N leads the phase of the pilot signal in convolution N by 90°. Referring now to convolution N+1 in FIG. 3, which immediately succeeds convolution N, it will be seen that the phase of the pilot signal recorded in convolution N+1 lags the phase of the pilot signal recorded in convolution N. The net result is that the N−1 pilot signal has a phase relationship with respect to the N pilot signal which is equal in magnitude, namely 90°, but opposite in polarity with respect to the phase relationship between the N pilot signal and the N+1 pilot signal. These phase relationships have a significant part in the tracking and position control of a pickup device in accordance with the principles of the present invention.

Referring now to FIG. 4, it will be recalled that the pilot signal is recorded at recording wavelengths which are relatively large as compared to the recording wavelength of the picture signal information and for that matter, the sound signal information. As a result of the relatively large recording wavelengths, the signal pickup device shown diagrammatically in FIG. 4 as 70 is able to pick up information from convolution N which is related to the pilot tone recorded in convolution N but is also able to pick up some signal content from the pilot tone recorded in convolutions N+1 and N−1 of the video disc record 72. However, the picture and sound information which is recorded in the information track has such relatively short wavelengths that the pickup device 70 is effective to recover only the signal information recorded in convolution N when the pickup device 70 is centered on N. It will be seen now that if the pickup device shown in FIG. 4 should drift towards convolution N+1 then a greater amount of coupling of the pilot signal recorded in convolution N+1 will be recovered and relatively less pilot signal content from convolution N−1 will be picked up. The pickup device 70 responds to the pilot signals recorded in convolutions N, N+1 and N−1 in a fashion which effectively sums the signal content from each of these three convolutions. Thus, when the pickup device 70 moves toward N+1, the effect is a shifting of the zero crossing of the composite recovered pilot signal. The shift of the zero crossing will, in this instance, make the recovered composite pilot signal look more like the pilot signal recorded in N+1. When the pickup device 70 drifts away from the center of convolution N toward N−1, then the recovered composite pilot signal will tend toward a waveform similar to the pilot signal recorded in N−1.

Figure 5:
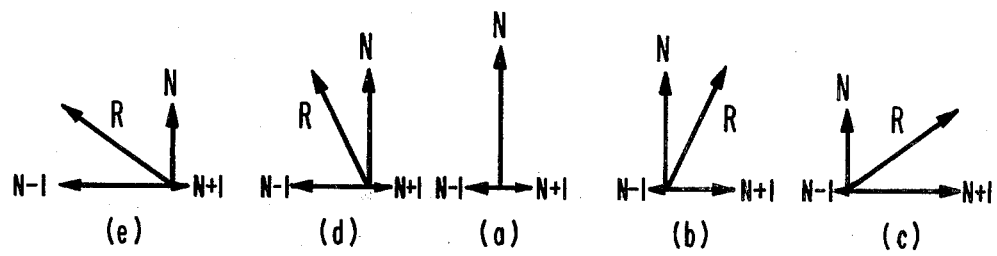

Another way of visualizing the operation of the pilot signal may be obtained with reference to the vector diagrams of FIGS. 5a through 5e. FIG. 5a vectorially shows the situation when the pickup device is centered on convolution N. There is an equal magnitude but opposite polarity influence provided by the pilot signals recorded in convolutions N+1 and N−1. FIG. 5b illustrates the situation when the pickup stylus is moving from the center of convolution N toward N+1. It will be seen that the pilot signal contribution from N+1 is now exerting more influence than the pilot signal recorded in N−1, and, of course, as the pickup stylus moves from the center of convolution N the relative magnitude of the pilot signal recovered from N decreases. In FIG. 5c, the case is shown where the stylus has moved almost completely over into convolution N+1. Now, the pilot signal from N−1 exerts very little influence and the pilot signal from N has been further reduced in magnitude while the pilot signal recovered from N+1 is increasing in magnitude and thus has a greater influence on the resultant recovered pilot signal shown as R in the vector diagrams. FIGS. 5d and 5e are vector diagrams which correspond to diagrams 5b and 5c for the case where the pickup stylus is moving away from convolution N towards N−1. Again, the influence of the pilot signal recorded in the adjacent convolution N−1 is seen to increase as the stylus moves away from the center of N.

The description of the invention thus far has demonstrated the manner in which a recorded pilot tone signal having a non-integral number of cycles per convolution of a spiral information track may be utilized to provide some information relative to the radial direction of travel of a pickup stylus on a video disc record with respect to a given convolution of that spiral track. However, it is necessary to provide some form of reference for the recovered pilot signal in order that a measurement might be made indicative of not only the direction but the degree of travel away from a given desired convolution. The reference signal which will be subsequently used to measure the phase changes of the recovered pilot signal is derived from information which was recorded at relatively short wavelengths within the given desired convolution. By so doing, each convolution of the spiral track automatically and inherently carries with it a reference signal for use in this phase measuring arrangement. This is most desirable since it means that no matter where the pickup device or stylus is placed on the information track the reference signal and the pilot signal which will be compared in phase are always immediately available.

Referring now to FIG. 6, a video disc player 80 (e.g., of the type shown in the abovementioned Clemens patent) has a turntable 82 for rotatably supporting a video disc 84 having a spiral information track containing picture signal information inclusive of synchronizing components, sound signal information accompaniment, and a pilot signal. Again, the frequency of the pilot signal recorded on disc 84 is such that a non-integral number of pilot signal cycles occupy each convolution of the spiral track and in the example under discussion, results in a phase difference of 90° with respect to the pilot signal recorded in successive convolutions. The synchronizing components are recorded such that an integral number of synchronizing components are included in each convolution of the spiral track. The player 80 further includes a carriage 86 which is subject to translation in synchronism with the radial motion of the player stylus during playback. The carriage 86 has a compartment for removably receiving a cartridge 88 which houses the signal pickup assembly.

A pickup circuit 90, responsive to the output of the signal pickup, develops at its output terminal a signal representative of the recorded information. The pickup circuit 90 is illustratively of the type described in U.S. Pat. No. 4,080,625, issued on Mar. 21, 1978 to Kawamoto, et al. The output of the pickup circuit 90 is delivered to a pair of band pass filters 92 and 94. The picture carrier band pass filter 92 has a relatively wide pass band encompassing the deviation range of the high frequency picture carrier (e.g., 4.3 to 6.3 MHz) as well as the requisite adjacent side band regions, and selectively passes the picture carrier component of the recorded signal to the relative exclusion of the sound carrier component thereof.

The sound carrier band pass filter 94 has a relatively narrow pass band encompassing the deviation range of the low frequency sound carrier (e.g., 716 KHz±55 KHz) as well as the requisite adjacent side band regions, and selectively passes the sound carrier component of the recorded signal to the relative exclusion of the picture carrier component.

The outputs of the respective band pass filters 92 and 94 are passed to respective demodulators 96 and 98. The picture demodulator 96 develops at its output terminal the recorded picture signal information inclusive of synchronizing components, and, the sound demodulator 98 develops at its output the recorded audio signal information.

A picture signal processor 100, coupled to the picture demodulator 96, effects the separation of the chrominance information from the luminance information. A composite video signal generator 102 recombines the chrominance and the luminance information in accordance with, for example, the NTSC format. A transmitter 104 processes the sound, luminance and the chrominance information to form a suitable signal for delivery to a color TV receiver 106. Receiver 106 then displays the color image and provides the audio information developed in accordance with the information signals previously recorded on video disc 84. Illustratively, where signal delivery to the antenna terminals of a color TV receiver is desired, the circuits in transmitter 104 include means for combining the separated components to form a new composite signal, which composite signal modulates a suitable rf carrier. U.S. Pat. No. 4,097,899 issued on June 27, 1978 to J. P. Yu, illustratively describes a transmitter apparatus useful for providing the functions of transmitter 104.

In order to separate out the recovered pilot signal, band pass filter 108 is provided and is coupled to pickup circuit 90. Filter 108 permits passage of signals at the pilot signal frequency within a suitable band pass range while excluding signals at the picture carrier and sound carrier frequencies. The output signals from band pass filter 108 are then applied to a phase adjust circuit 110. The phase adjust circuit 110 is provided for the initial setting of the system and is required only for the purpose of initially peaking the phase response of the tracking control circuitry. The phase adjust circuit 110 is peaked in order to compensate for signal delays through the system and once the proper phasing is obtained, it need not be set or reset again. The output signals from phase adjust circuit 110 are then provided to a limiter 112. Limiter 112 is a high gain circuit and provides clipping above and below an average signal value such that it is effective to provide a pulse type signal whose pulse position is dependent upon the phase of the signal applied thereto. Thus, as the phase of the recovered pilot signal changes, the pulse position relative to the reference provided at the output of limiter 112 will also change.

FIG. 6 also shows the circuitry for developing the previously referred to phase reference signal. This circuitry comprises the horizontal sync separator 114 which is responsive to the composite video signal provided at the output of the composite video signal generator 102. In addition, a field No. 1 detector 116 is also made responsive to the output signals from composite video signal generator 102. As previously described, the field No. 1 detector will put out a pulse upon the simultaneous occurrence of vertical sync, horizontal sync, and a specific phase of the color burst phase signal. The output pulse from detector 116 is used to initiate the timing for the development of the phase reference signal by applying a reset pulse which occurs once every 1050 horizontal pulses to a counter, which is a divide-by-two counter 118. The output signals from counter 118 are then provided to the C input of a latching type flip-flop 120. In addition, the output pulse signals from counter 118 are also provided to the input terminal of an inverting gate 122. The signals provided at the output terminal of gate 122 are supplied to the C input terminal of another latching type flip-flop 124. The latched signal from flip-flop 120 is provided at the D input terminal of flip-flop 124. In addition, the pulse train signal provided at the output terminal of limiter 112 is provided to the D input terminal of the latching flip-flop 120.

The pulse train provided by limiter 112 is also supplied to one input terminal of an exclusive OR gate 126. The output signals from latching flip-flop 124 are supplied to another input terminal of exclusive OR gate 126. The pulse signals provided at the output of gate 126 are then supplied to the input of a low pass filter 128. The signal provided at the output of low pass filter 128 is then supplied to a converter 130 which functions to convert the voltage waveform provided from low pass filter 128 to a suitable current level for application to a device for controlling the position of the pickup device relative to the desired convolution of the information track.

The operation of the pilot signal and reference signal circuits will be best understood when viewed in relation to the waveforms shown in FIGS. 7a through 7e. Each of the waveforms shown in FIGS. 7a through 7e are referenced to corresponding points in FIG. 6. FIG. 7a shows the pulse train provided at the output terminal of limiter 112. The waveform of FIG. 7a is applied to the D input of latching flip-flop 120. The signal shown in FIG. 7b is the signal provided at the output of counter 118 and is provided to the C input terminal of flip-flop 120. The operation of flip-flop 120 is such that on the negative transition of the waveform of FIG. 7b, the level of the waveform in FIG. 7a is analyzed or detected and latched to the output of flip-flop 120. The resulting waveform at the output of flip-flop 120 is shown in FIG. 7c. The waveform of FIG. 7c is then applied to the D input terminal of flip-flop 124. The waveform of 7b is applied through inverting gate 122 to the C input of flip-flop 124. The operation of flip-flop 124 is such that the waveform of FIG. 7c is analyzed on positive-going transitions of the waveform of FIG. 7b and the level thus detected is latched to the output terminal of flip-flop 124. The output signal from flip-flop 124 is shown in FIG. 7d.

Exclusive OR gate 126 is responsive to the waveforms of FIGS. 7a and 7d and operates such that a high level is provided when both waveforms are high or when both waveforms are low and also provides a low output signal when the waveforms of the signals 7a and 7b are different from each other.

Figure 7:
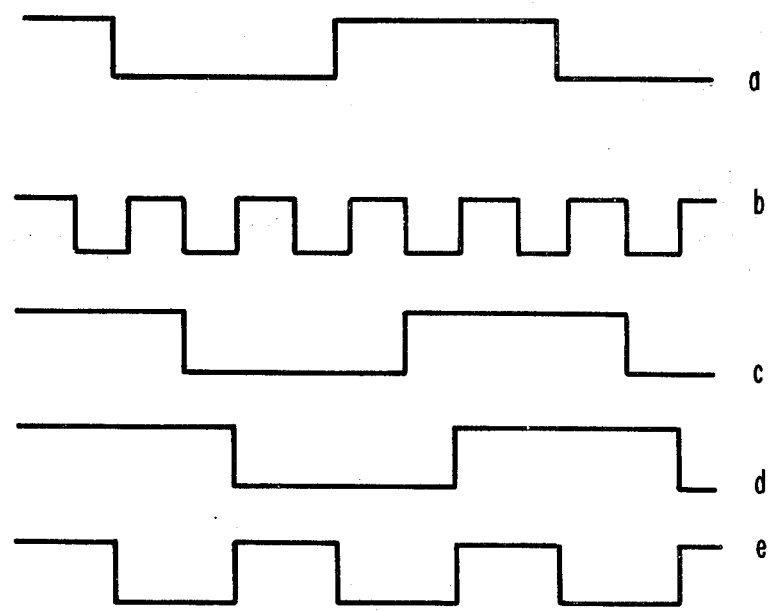

The waveforms shown in FIG. 7, especially the waveforms shown in FIGS. 7b and 7a, illustrate how the reference signal is provided in the form of FIG. 7b which was developed from information recorded on the relatively high frequency picture carrier as well as the variable phase signal shown in FIG. 7a developed as a result of recording the relatively long wavelength of the pilot signal. The phase adjustment circuit 110 can be adjusted so that the transitions of the signal of FIG. 7a will line up directly with one of the up transitions of the waveform shown in FIG. 7b. Thus, when the pickup is in the center of the track there will be zero average value signal when the waveform of FIG. 7e is processed through low pass filter 128 when the phase adjust circuit 110 is set as described above. The phase adjust circuit may also be set so that there is some average value of current provided when the pickup is centered on a given convolution. Now, if the waveform of FIG. 7a is generally shifted to the left as the result of the pickup moving toward one side of a desired convolution, the waveform in FIG. 7e will be effective to provide negative content. If, however, the waveform of FIG. 7a shifts to the right as a result of the pickup moving toward the other side of the desired convolution, the energy content on the high side of FIG. 7e will increase with a concomitant decrease of the energy on the low side of FIG. 7e. Thus, the waveform provided and shown at FIG. 7e contains information dependent upon its energy above or below a nominal value which is indicative of the direction of travel of the stylus pickup in radial directions away from the desired convolution to be tracked at any particular moment. The waveform of FIG. 7e may now be used to control the position of the pickup device in response to the phase relationship between the recovered pilot signal and the reference signal which is contained in each and every convolution of the spiral track.

It will be noted that if the above-mentioned pilot signal frequency of $131\frac{1}{4}$ cycles per convolution (i.e. approximately 15,750/8 cps) is found to be too low for some applications, a higher frequency which is an odd multiple of the above-mentioned frequency may be used for the pilot signal.

In the embodiment illustrated in FIG. 1a, the phase reference signal, which has a frequency above the audio frequency band (e.g. 20 KHz), is extracted from the audio channel during playback, instead of deriving it from the horizontal sync information as is shown in FIG. 6. For example, a band pass filter, centered about the phase reference signal frequency, may be disposed in the player audio channel for directly providing the phase reference signal.

Referring now to FIG. 8, a portion of the video disc player carriage 86 is shown including a support arm 140 which has a stylus pickup device 142 located at one end thereof. The stylus arm 140 and stylus 142 are arranged typically in a cartridge such that the stylus will protrude through an opening 144 so as to rest on the information track of the video disc record during playback. As shown in FIG. 8 the stylus support arm also includes in this case a permanent magnet 146 which is placed between two support members 148 and 150. A single wire 152 is wound about support member 150 and is also wound about support member 148. Typically, there will be on the order of 40 or 50 turns provided on support member 150 and a like number of turns on support member 148.

A control current is provided from the output terminal of the voltage to current converter 130 shown in FIG. 6 to the control wire 152. Upon application of the control current a magnetic field is set up in the vicinity of the permanent magnet 146. The magnetic circuit shown in FIG. 8 is such that for a nominal value of control current the stylus 142 is in a centered position over the desired given convolution of the information track. In the event that the stylus should drift from the given convolution toward an adjacent convolution, a different control current will be applied via wire 152 in a direction to set up magnetic forces which will bring the pickup stylus 142 back toward the center of the given convolution of the information track. Similarly, if the pickup stylus 142 drifts in the opposite direction another current level will be applied via line 152 which will cause the magnetic forces to pull the stylus 142 back toward the center of the desired convolution of the spiral information track. As long as the control current is at the nominal value, the magnetic forces will be such to keep the stylus 142 centered on the desired convolution of the information track.

FIG. 9 is another view of the magnetic circuit of FIG. 8. In FIG. 9 the permanent magnet 146 is shown mounted on the stylus support arm 140 in such a way that the north pole of permanent magnet 146 is between the magnetic poles developed on the support members 150 and 148. The support arm 140 is arranged such that its lateral compliance keeps the stylus 142 centered under the nominal conditions. When the control current is applied at levels above the nominal control current, the magnetic forces are increased such that permanent magnet 146 is attracted toward support member 148 and repelled at the same time from support member 150. When the control current is decreased below a nominal value, the magnetic forces on permanent magnet 146 are decreased and the stylus support are will be positioned accordingly. The arrangement shown in FIGS. 8 and 9 is merely one way of controlling the tracking position of a pickup stylus in response to the development of an error signal.

The invention described herein will be useful in many forms of systems where active tracking and control of a pickup device is desired. For example, the principles of this invention will be useful in a video disc system including a record having a groove. The groove and the active control can be combined to provide an extremely reliable tracking system. In addition, the principles of the present invention are also very desirable for use with a grooveless disc. The present invention as described herein provides a relatively straight forward system for active tracking wherein only one pilot signal need be recorded. The use of a single pilot signal for active tracking not only simplifies the recording apparatus but also makes the playback apparatus relatively straight forward as compared to systems wherein two pilot tone signals are utilized.

The present invention has been described in the context of a video disc having a spiral information track, whether grooved or grooveless. However, it will be appreciated that the principles of this invention are equally useful to systems wherein information is recorded in concentric information tracks. In fact, the principles of the present invention will be useful in any system wherein it is possible to provide a pilot tone signal and a reference phase signal within the same convolution of an information track. Thus, this invention will also be useful in many forms of optical disc systems for both information storage as well as video recording and playback.

There are other advantages achieved during the use of the present invention. For example, processes such as electro-mechanical recording may be used for the production of masters and subsequently stampers in the manufacturing process. Systems which require side track pilot signals would be difficult, if not impossible, to master using electro-mechanical cutter techniques. Another advantage of the present system is that the initiation of the tracking process when starting to play an information track is quick and simple and the system will lock to any convolution on which the pickup is started. This, again, results from the fact that each convolution of the information track contains the reference signal which will be used for comparing the variable phase of the pilot signal recorded in that convolution.

What is claimed is:

1. In a playback apparatus for use with a disc record having an information track comprising a plurality of convolutions containing recorded representations of signal information including phase reference information and a pilot signal, said pilot signal being recorded such that each convolution of said information track contains a non-integral number of cycles of said pilot signal, the phase of said pilot signal in a given convolution having a known relationship with respect to the phase of said pilot signal in an immediately preceding convolution and the phase of said pilot signal in the convolution immediately succeeding said given convolution, said playback apparatus including a signal pickup means for sensing said recorded representations along said information track during playback rotation of said disc, the tracking control apparatus comprising:

means responsive to the signals provided by said signal pickup means for providing a first signal representing the sensed phase content of said pilot signal recovered from said given convolution and from said preceding and succeeding convolutions;

means responsive to said signals provided by said signal pickup means sensed from said given convolution for providing a phase reference signal;

means for comparing the phase of said first signal and said phase reference signal for providing an error signal; and means responsive to said error signal for maintaining said signal pickup means in a desired location along said information track.

2. The tracking control apparatus according to claim 1 wherein the phase of said error signal is indicative of the radial direction of travel of said signal pickup means.

3. The tracking control apparatus according to claim 2 wherein said phase reference providing means derives said phase reference signal in response to recovered components of said phase reference information.

4. The tracking control apparatus according to claim 3 wherein said positioning means comprises a magnetic system responsive to said error signal for controlling the position of said signal pickup means.

5. In a playback apparatus for use with a video disc record having a spiral information track comprising a plurality of convolutions containing recorded representations of picture signal information inclusive of synchronizing components, sound signal information and a pilot signal, said pilot signal being recorded such that each convolution of said spiral track contains a non-integral number of cycles of said pilot signal causing a regular progression of the phase of said pilot signal from any one convolution to the next succeeding convolution, the recording wavelength of said pilot signal being substantially greater than the recording wavelength of said picture signal information and said sound signal information, said playback apparatus including a signal pickup means for sensing said recorded representations along said spiral information track during playback rotation of said disc, said playback apparatus further comprising means coupled to said signal pickup means for providing a picture output signal and a sound output signal, the tracking control apparatus comprising:

means responsive to the signals provided by said signal pickup means for providing a first signal representing the sum of the pilot signal phase information sensed from a given convolution of said spiral track and from the convolutions preceding and succeeding said given convolution when said pickup means is positioned along said given convolution;

means responsive to said one of said picture output signal or said sound output signal for providing a phase reference signal when said pickup means is positioned along said given convolution;

means for comparing the phase of said first signal and said phase reference signal for providing an error signal, said error signal having an average energy content when said signal pickup means is tracking said given convolution and an above average energy content when said signal pickup means travels away from said given convolution towards a convolution on one side of said given convolution and a below average energy content when said pickup means travels away from said given convolution towards a convolution on the other side of said given convolution; and means responsive to said error signal for maintaining said signal pickup means along said given convolution.

6. The tracking control apparatus according to claim 5 wherein said playback apparatus includes a picture FM demodulator for recovering said picture signal information from said record in cooperation with said pickup means and wherein said picture FM demodulator provides picture signal information only with respect to the particular convolution sensed by said pickup means at a particular time.

7. The tracking control apparatus according to claim 5 wherein said pickup means comprises a signal pickup device connected to one end of a support arm and wherein said error signal responsive means comprises:

a permanent magnet connected to said support arm; and an electromagnetic circuit responsive to said error signal for applying a magnetic field in the vicinity of said permanent magnet effective to position said support arm in accordance with the energy content of said error signal.

8. The tracking control system according to claim 5 wherein said synchronizing components include horizontal line synchronization components and wherein said phase reference signal is derived from said horizontal line synchronization components.

9. The tracking control system according to claim 8 wherein the frequency of said pilot signal is a divided down version of the frequency of said horizontal line synchronization components.

10. In a playback apparatus for use with a video disc record having a spiral information track comprising a plurality of convolutions containing recorded representations of picture signal information including frame, field and line synchronization components, sound signal information and a pilot signal in successive convolutions of said spiral track, each convolution containing a specified integral number of frames, said pilot signal being recorded such that each convolution of said spiral track contains a non-integral number of cycles of said pilot signal causing a regular progression of the phase of said pilot signal from any one convolution to the next succeeding convolution, the recording wavelength at the frequency of said pilot signal being greater than the recording wavelength of said picture signal and greater than the recording wavelength of said sound signal, said playback apparatus including a signal pickup means including a stylus mounted on a support arm for sensing said recorded representations along said spiral information track during playback rotation of said disc, said playback apparatus further comprising means coupled to said signal pickup means for providing a picture signal output, the tracking control apparatus comprising:

means including a filter means responsive to the signals provided by said signal pickup means for providing a first signal at the pilot signal frequency representing the sum of the pilot signal phase information sensed from a given convolution of said spiral track and the pilot signal phase information sensed from convolutions preceding and succeeding said given convolution when said stylus is positioned along said given convolution;

means including counter means responsive to said picture signal output for providing a phase reference signal derived from selected ones of said line synchronization components when said stylus is positioned along said given convolution;

means including signal latching circuits for comparing the phase of said first signal with said reference signal for providing an error signal, said error signal having an average energy content when said stylus is tracking said given convolution and an above average energy content when said stylus travels away from said given convolution towards a convolution on one side of said given convolution and a below average energy content when said stylus travels away from said given convolution towards a convolution on the other side of said given convolution; and means coupled to said pickup means and responsive to said error signal for maintaining said stylus along said given convolution.

11. The tracking control apparatus according to claim 10 wherein said playback apparatus includes a picture FM demodulator for recovering said picture signal information from said record in cooperation with said pickup means and wherein said picture FM demodulator provides picture signal information only with respect to the particular convolution sensed by said stylus at a particular time.

12. The tracking control apparatus according to claim 11 wherein said error signal responsive means comprises:

a permanent magnet connected to said stylus support arm;

an electromagnetic circuit for applying a magnetic field in the vicinity of said permanent magnet effective to position said stylus in said given convolution in response to the energy content of said error signal.

13. The tracking control system according to claim 12 wherein said frame, field and line synchronization components are radially aligned on said record and wherein two frames of picture signal information are recorded in each convolution of said spiral track.

14. The tracking control system according to claim 13 wherein said spiral information track is formed on a grooveless surface of said video disc record.

15. A system for recording signals on a disc master comprising:

means for providing a first signal including phase information components;

a turntable for rotatably supporting said disc master;

means for developing a non-modulated pilot signal having a non-integral number of cycles per turntable revolution;

a frequency modulator for developing a carrier wave having an instantaneous frequency which is varied over a deviation range in accordance with the amplitude of said first signal;

the frequency of said pilot signal being lower than the instantaneous frequency of said carrier wave;

means for additively combining said pilot signal and said frequency modulated carrier wave for providing a recording signal; and means for recording a representation of said recording signal along an information track having a plurality of convolutions on said disc master;

said pilot signal recorded in a given convolution having a fixed phase relationship with respect to said phase information components in said given convolution of said information track and having a substantially 90° phase relationship with respect to the pilot signal recorded in a convolution preceding said given convolution and having an equal magnitude, opposite polarity phase relationship with respect to the pilot signal recorded in a convolution succeeding said given convolution.

16. The recording system according to claim 15 wherein said first signal providing means is a picture signal source and wherein said phase information components are derived from horizontal line synchronization pulses.

17. The recording system according to claim 16 wherein said pilot signal is generated from a frequency divided down version of said horizontal line synchronization pulses.

18. The recording system according to claim 17 wherein said pilot signal developing means comprises:

a horizontal line synchronization pulse separator responsive to said first signal for separating said horizontal line pulses from said first signal;

frequency divider means for providing said divided down version of said horizontal line pulses; and means for coupling said divided down version of said horizontal line pulses to said combining means.

19. The recording system according to claim 18 wherein said picture signal source provides picture signals in the NTSC format and wherein two frames of picture information are recorded in each convolution of said information track.

20. The recording system according to claim 15 wherein said first signal providing means includes a sound signal source and wherein said phase information components are additively combned with a sound signal provided by said sound source for generating said first signal.

* * * * *